(12) United States Patent
Calcev et al.

(10) Patent No.: US 7,466,665 B2
(45) Date of Patent: Dec. 16, 2008

(54) METHOD AND APPARATUS FOR ROUTE DISCOVERY WITHIN A COMMUNICATION SYSTEM

(75) Inventors: George Calcev, Hoffman Estates, IL (US); Jeffrey D. Bonta, Arlington Heights, IL (US); Benedito J. Fonseca, Jr., Lombard, IL (US)

(73) Assignee: Motorola, Inc., Schaumburg, IL (US)

( * ) Notice: Subject to any disclaimer, the term of this patent is extended or adjusted under 35 U.S.C. 154(b) by 975 days.

(21) Appl. No.: 10/603,558

(22) Filed: Jun. 25, 2003

(65) Prior Publication Data

US 2004/0264422 A1 Dec. 30, 2004

(51) Int. Cl.
*H04L 12/28* (2006.01)

(52) U.S. Cl. .................... 370/255; 370/338; 370/351; 709/238; 709/239; 709/243; 709/244

(58) Field of Classification Search ........................ None
See application file for complete search history.

(56) References Cited

U.S. PATENT DOCUMENTS

| | | | |
|---|---|---|---|
| 6,304,556 B1 * | 10/2001 | Haas ........................... 370/254 |
| 6,704,293 B1 * | 3/2004 | Larsson et al. ............... 370/255 |
| 6,810,428 B1 * | 10/2004 | Larsen et al. ................ 709/238 |
| 2002/0145978 A1 * | 10/2002 | Batsell et al. ................ 370/238 |
| 2003/0033394 A1 * | 2/2003 | Stine ........................... 709/222 |
| 2003/0202477 A1 * | 10/2003 | Zhen et al. ................... 370/248 |
| 2003/0204625 A1 * | 10/2003 | Cain ............................ 709/243 |
| 2004/0029553 A1 * | 2/2004 | Cain ............................ 455/403 |

* cited by examiner

*Primary Examiner*—Wing F Chan
*Assistant Examiner*—Anthony Sol

(57) ABSTRACT

An overlay communication system (120) aides determining a route between nodes (101-103) in an underlay communication system (110). In particular, when a first node (102) wishes to discover a route to a second node (103), the first node notifies the overlay communication system, which notifies all nodes in the underlay communication system of the desire. Both the first and the second nodes begin flooding the underlay system simultaneously. When a node in the underlay system hears both the flood messages from the first and the second node, the overlay communication system is notified and stops all flooding. The route information is then provided to the first and the second nodes via the overlay communication system.

14 Claims, 5 Drawing Sheets

100

METHOD AND APPARATUS FOR ROUTE DISCOVERY WITHIN A COMMUNICATION SYSTEM

FIELD OF THE INVENTION

The present invention relates generally to communication systems and in particular, to a method and apparatus for route discovery within such communication systems.

BACKGROUND OF THE INVENTION

Route discovery within a communication system is well known. In particular, a message flooding procedure occurs that is often the basis of on-demand route discovery and network initialization. Message flooding is basically defined as a broadcast procedure covering a complete network. It operates as follows: When a node, or remote unit, in a network wishes to discover a route to another node in the network a message is broadcasted to all of its neighbors specifying the destination address. Upon receiving the message, all of the neighboring nodes will rebroadcast the message to their neighbors. When a node receives the same message again, it discards it. The procedure repeats itself until all of the nodes in the network are reached, or a time-to-live for the message expires. As discussed, the purpose to flood the network in a routing algorithm is essentially to find a path to send data to destinations. The message content is usually a request of route discovery.

Although message flooding is a dependable way to find a route within the network, flooding is proven to generate excessive amounts of system traffic and interference. In particular, the exponential increase of the signaling messages, due to the fact that every host in the searched area has the obligation to rebroadcast the route-discovery packet, leads to serious redundancy, contention, and collision. Therefore, a need exists for a method and apparatus for route discovery within a communication system that minimizes system interference caused by message flooding.

DETAILED DESCRIPTION OF THE DRAWINGS

Figure 1:
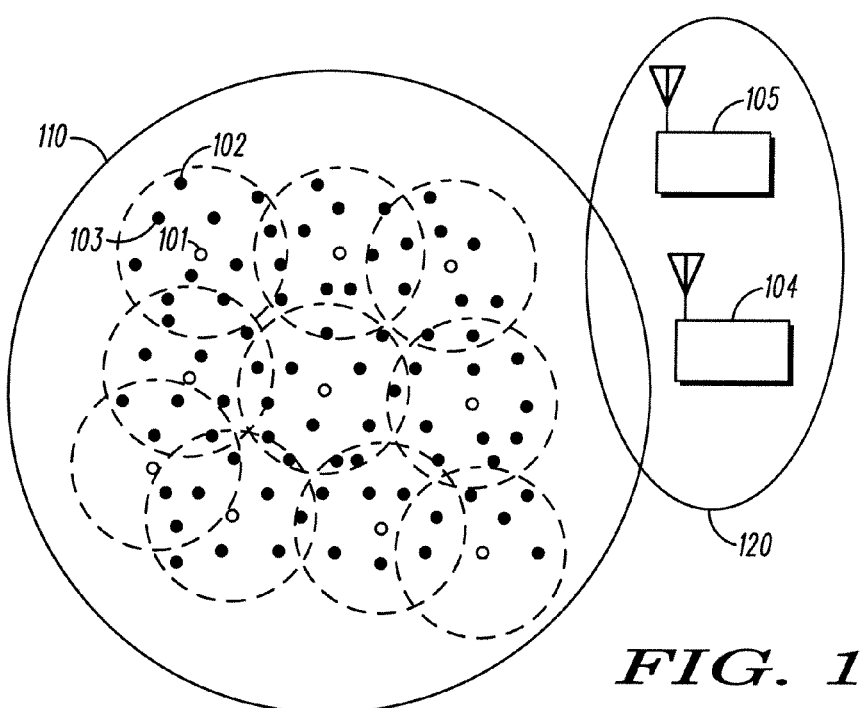
FIG. 1 is a diagram of a communication system in accordance with the preferred embodiment of the present invention.

To address the need for route discovery within a communication system, a method and apparatus for flooding is provided herein. In accordance with the preferred embodiment of the present invention an overlay communication system aides in determining a route between nodes in an underlay communication system. In particular, when a first node wishes to discover a route to a second node, the first node notifies an overlay communication system, which notifies all nodes in the underlay communication system of the desire. Both the first and the second nodes begin flooding the underlay system simultaneously. When a node in the underlay system hears both the flood messages from the first and the second node, the overlay communication system is notified and stops all flooding. The route information is then provided to the first and the second nodes via the overlay communication system.

Because flooding takes place simultaneously from two nodes within the underlay communication system, the search will reduce the amount of signaling in half for a uniform distribution of the ad hoc nodes. This will equate into a less interference in the ad hoc network and less battery drain. A second advantage of the disclosure is the reduction of discovery time. If the search is unidirectional the expected time to discover the route is the time that a flood message reaches the target plus the time that the acknowledgement reaches the source. In the preferred embodiment of the present invention this time is cut in half since the message and the acknowledgement have to parse half of nodes than in the actual algorithms.

The present invention encompasses a method for route discovery. The method comprises the steps of determining that a first node needs to communicate with a second node, sending, by the first node, a message to an overlay communication system notifying the overlay communication system of the need to communicate with the second node, and receiving, from the overlay communication system, instructions to broadcast a route-discovery message. The route discovery message is broadcast, and route information is then received from the overlay communication system.

The present invention additionally encompasses a method comprising the steps of receiving, by a first node, from an overlay communication system, a message instructing the first node to broadcast a route discovery message, wherein the first node exists within an underlay communication system, and broadcasting the route discovery message.

The present invention additionally encompasses a method for operating a node within an underlay communication system. The method comprises the steps of receiving a route-discovery message from a first node, receiving a route-discovery message from a second node, determining route information based on the route-discovery messages, and transmitting the route information to the first node.

The present invention additionally encompasses a method comprising the steps of receiving a message from a first node in an underlay communication system, the message indicating a need to discover a route to a second node, broadcasting a message to nodes within the underlay communication system, the message instructing the nodes to monitor for flood messages from the first and the second nodes, and receiving a message from a third node in an underlay communication system, the message comprising route information. Finally, the route information is transmitted to the first node.

The present invention additionally encompasses an apparatus comprising means for determining that a first node needs to communicate with a second node, means for sending, by the first node, a message to an overlay communication system notifying the overlay communication system of the need to communicate with the second node, means for receiving, from the overlay communication system, instructions to broadcast a route-discovery message, means for broadcasting the route discovery message, and means for receiving route information from the overlay communication system.

The present invention additionally encompasses an apparatus comprising means for receiving, by a first node, from an overlay communication system, a message instructing the first node to broadcast a route discovery message, wherein the first node exists within an underlay communication system, and means for broadcasting the route discovery message.

The present invention additionally encompasses an apparatus comprising means for receiving a route-discovery message from a first node, means for receiving a route-discovery message from a second node, means for determining route information based on the route-discovery messages, and means for transmitting the route information to the first and the second nodes.

Finally, the present invention encompasses an apparatus comprising means for receiving a message from a first node in an underlay communication system, the message indicating a need to discover a route to a second node, means for broadcasting a message to nodes within the underlay communication system, the message instructing the nodes to monitor for flood messages from the first and the second nodes, means for receiving a message from a third node in an underlay communication system, the message comprising route information, and means for transmitting the route information to the first nodes.

Turning now to the drawings, wherein like numerals designate like components, FIG. 1 is a diagram of communication system 100 in accordance with the preferred embodiment of the present invention. In the preferred embodiment of the present invention communication system 100 comprises an ad-hoc underlay communication system 110. In the preferred embodiment of the present invention underlay communication system is preferably a neuRFon™ communication system, available from Motorola, Inc. (www.motorola.com), however, in alternate embodiments of the present invention, underlay communication system 110 may comprise any ad-hoc network, such as, but not limited to a WLAN network typically utilizing IEEE 802.11b ad hoc networking protocols or RoofTop™ Wireless Routing mesh network manufactured by Nokia, Inc. Additionally, communication system 100 comprises a cellular overlay communication system 120 such as a Code Division, Multiple Access (CDMA) communication system. To maximize the lifetime of devices within communication system 110, devices operate in a low-duty cycle mode. Because of this, communication coordination becomes critical.

As shown, communication system 110 comprises a plurality of nodes 101-103. The plurality of nodes form an underlay communication network, with each node capable of short-range communication to neighboring nodes only. Overlay communication system 120, comprising a plurality of transceivers 104-105, is capable of communication with each node of underlay communication network 110. In the preferred embodiment of the present invention transceivers 104-105 are preferably cellular base stations. During underlay network initialization, an infrastructure is formed with a subset of nodes 101 (10 are shown in FIG. 1) that receive communication requests and announce communication schedules to their neighboring nodes. Nodes 101 are typically identified as Coordination Devices or coordinators, which facilitate low duty cycle coordinated communications in neuRFon™ networks. Any node 102, 103 in such a network will be in the range of one or multiple coordinators 101.

Figure 2:
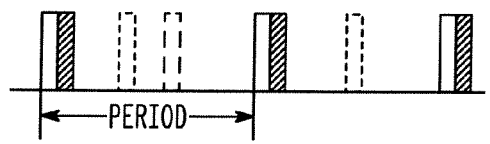
FIG. 2 and FIG. 3 illustrate transmission within the communication system of FIG. 1.

During typical transmission within underlay communication system 110, a device (or node) 102, 103 will schedule a time period to transmit through a given coordinator 101, and to receive through the given coordinator 101. This is illustrated in FIG. 2. As shown in FIG. 2, each coordinator 101 has a time window (reservation window) to receive its neighbors' 102, 103 communication requests (for both unicast and broadcast) in each period. Each coordinator 101 additionally has a time window (beacon window) to broadcast schedules in each period, to its neighbors. The established network structure allows all neighboring nodes to synchronize with its coordinator's reservation and beacon windows. Thus, in accordance with the preferred embodiment of the present invention, all nodes 101-103 must wake up in a beacon window to receive transmit/receive schedules. The durations of a reservation window and a beacon window, as well as any real communications, are very short compared with the length of a period. All devices 101-103 sleep at times other than these states, and low duty cycle is therefore achieved.

Figure 3:
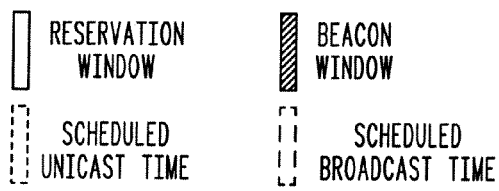
Figure 3:
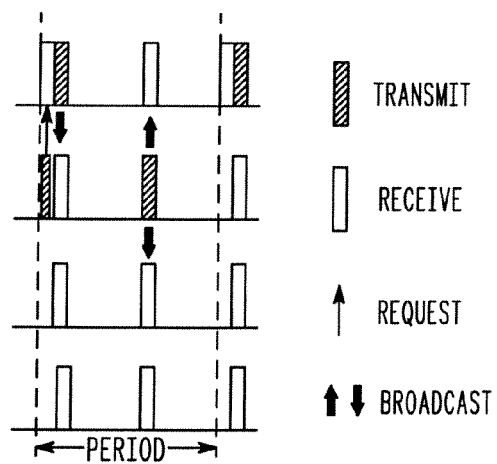

An example of broadcasting a message within communication system 110 is illustrated in FIG. 3. As shown, source node 102 sends a broadcast request to all coordinators 101 within its range within their reservation windows. A coordinator that receives the request announces in its next beacon window when the broadcast should happen. All nodes 102 that hear the announcement from a coordinator and are also the neighbors of the source node wakes up at the broadcast time and listen to the broadcast. Eventually all neighbors of the source node will receive the broadcast through coordinators in the source node's range. Since each coordinator 101 has overlapping coverage with its nearest neighbors, some nodes 102-103 have more than one coordinator within its range. When a node 102 within range of more than one coordinator receives a broadcast, it will send a new broadcast request to all coordinators 101 within its range within their reservation windows. This new broadcast request will contain a sequenced list of IP addresses that represent the previous coordinator nodes 101 that have already participated in the broadcast procedure. A coordinator that receives the request that has never received this request before announces in its next beacon window when the next broadcast should happen. All nodes 102 that hear the announcement from a coordinator and are also the neighbors of the source node wakes up at the broadcast time and listen to the broadcast that now contains a sequenced list of IP addresses that represent the previous coordinator nodes 101 that have already participated in the broadcast procedure. This process repeats until all nodes 101-103 have heard the broadcast. When the desired destination node receives the broadcast, it will use the sequenced list of IP addresses that represent the previous coordinator nodes 101 that have participated in the broadcast procedure to send a message back to the source node 102. This message will contain the complete route information from the source node to the destination node.

As discussed above, message flooding is a dependable way to find a path within communication system 100, however, flooding generates an excessive amount of system interference. In order to address this issue, in the preferred embodiment of the present invention overlay communication system 120 aids in route determination for underlay communication system 110. In particular, when a first node within communication system 110 desires to generate route information to a second node, the first node transmits a route-needed (RT_NEED) to a transceiver (e.g., transceiver 104) within communication system 120. The route-needed message notifies overlay communication system 120 of the desire to determine a route from the first node to the second node. In the preferred embodiment of the present invention the RT_NEED message comprises the identity of the first node and the identity of the second node.

Once transceiver 104 receives the route needed message, transceiver 104 broadcasts a message (RT_D_AWARE) instructing all nodes within communication system 110 to listen for both a route discovery (RT_DISC) message from the first node and a route discovery (RT_DISC) message from the second node. The first node then performs standard route discovery techniques using RT_DISC messages to determine a proper route to the second node, however, unlike prior-art route discovery techniques, the second node also initiates route discovery to the first node, resulting in simultaneous route discovery (RT_DISC) messages flooding underlay communication system 110. When an intermediate node receives matching (RT_DISC) messages from both the first and the second node, it informs transceiver 104 in overlay network 120 of this fact, and provides route information to transceiver 104 via a route-information (RT_INFO) message. Transceiver 104 then broadcasts a message (FLOOD_STOP) instructing all nodes within underlay communication system 110 to stop message flooding, thus limiting the signaling and the interference in the system. Transceiver 104 additionally transmits the route-information (RT_INFO) message to the first node so that communication can take place between the first and the second nodes.

Because message flooding takes place simultaneously from both the source and the destination node, the searching time is reduced by as much as half when the number of hops between target and destination is medium or high (e.g. more than 3 hops). For example, by denoting with m the packet (60 bytes) transmission time and τ the maximum propagation delay (1 us) between two IEEE 802.11 WLAN stations, the maximum delay (δ) for a successful transmission is limited by:

$$\delta \leq m + 2\tau + SIFS + ACK + DIFS + E[CW]$$

Where E[CW] is the average backoff time (50 us for 10 stations 802.11b), SIFS (10 us) is Short InterFrame Space, DIFS is Distributed InterFrame Space (50 us), and ACK (0.12 us) is the Acknowledgement. The total discovery delay target is proportional to the expected number of hops between source and destination, which equates to a TTL (time-to-live) parameter for a proper design. The average discovery time is $E[n]*\delta$, where $E[n]$ is the expected number of hops between source and destination. In the proposed idea, E[n] represents the maximum of the expected number of hops between the source and the intermediate node, and the destination and the intermediate node, and is on average half of the number of hops between source and destination. Therefore the average delay is reduced in half. Notice that even if TTL is overestimated in design, the flooding procedure is stopped as soon as the intermediate node discovers a path between the source and a destination node.

Figure 4:
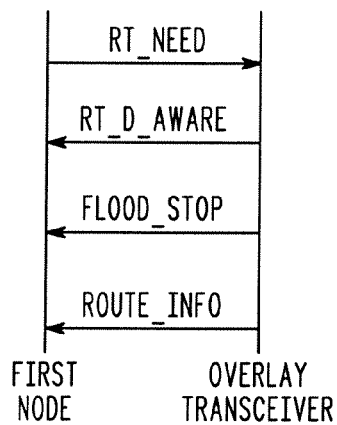
FIG. 4 through FIG. 6 show call-flow diagrams in accordance with the preferred embodiment of the present invention.

FIG. 4 is a message flow diagram showing route discovery in accordance with the preferred embodiment of the present invention. In particular, FIG. 4 shows messaging that takes place between a first node wishing to discover a route to a second node, and a transceiver within an overlay communication network. As shown, when the node wishes to discover a route, the node transmits a route-needed (RT_NEED) message to transceiver 104. In response, transceiver 104 broadcasts a route-discovery aware (RT_D_AWARE) message instructing all nodes within communication system 110 to listen for both a route discovery message (RT_DISC) from the first node and a route discovery message (RT_DISC) from the second node. Normal route discovery procedures then take place within ad-hoc network 110 where each node that receives a route discovery message (RT_DISC) that is not a duplicate of a previous (RT_DISC) message will rebroadcast the route discovery message (RT_DISC) until a time-to-live for the broadcasted message occurs. As discussed above, normal scheduling and flood messaging takes place, except that in the preferred embodiment of the present invention when a third node receives the (RT_DISC) flood message from both the first and the second nodes, this route information is provided to transceiver 104, causing transceiver 104 to broadcast a flood-stop (FLOOD_STOP) message to all nodes within network 110. Finally, route information is provided to the first node via a route information (RT_INFO) message. In the preferred embodiment of the present invention the route information message comprises information such as a sequence of IP addresses corresponding to each node from the first node to the second node.

Figure 5:
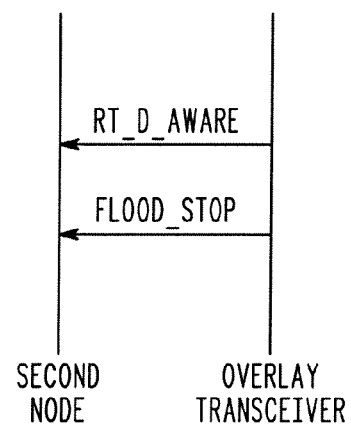

FIG. 5 is a message flow diagram showing the messages that flow between transceiver 104 and the second node. As discussed above, a first node wishes to discover a route to the second node, and initiates a route-needed message (RT_NEED) to transceiver 104. The second node is first made aware of the desire for communication via a route-discovery aware (RT_D_AWARE) message broadcast from transceiver 104. In response, the second node initiates normal route discovery procedures using (RT_DISC) messages to flood communication system 110. When a third node receives both the (RT_DISC) flood message from the first node, and the (RT_DISC) flood message from the second node, it transmits a route information (RT_INFO) message to transceiver 104 causing a flood-stop (FLOOD_STOP) message to be sent to all nodes within network 110.

Figure 6:
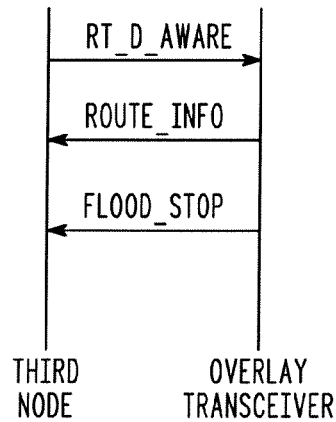

FIG. 6 is a message flow diagram showing the messaging that flows between transceiver 104 and the third node. As discussed above, a first node wishes to discover a route to the second node, and initiates a route-needed (RT_NEED) message to transceiver 104. The third node is first made aware of the desire for communication via a route-discovery aware (RT_D_AWARE) message transmitted from transceiver 104. In response, the first and the second nodes initiate normal route discovery procedures using (RT_DISC) messages to flood communication system 110. When the third node receives both the (RT_DISC) flood message from the first node, and the (RT_DISC) flood message from the second node, it informs transceiver 104 via a route-information (RT_INFO) message causing a flood-stop (FLOOD_STOP) message to be sent to all nodes within network 110.

Figure 7:
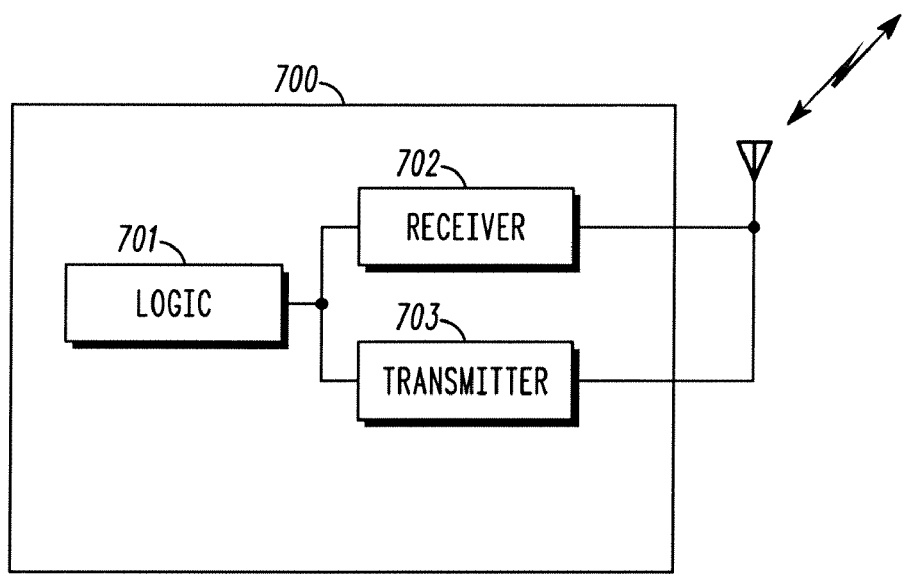
FIG. 7 is a high-level block diagram of a transceiver in accordance with the preferred embodiment of the present invention.

FIG. 7 is a high-level block diagram of transceiver 700 in accordance with the preferred embodiment of the present invention. In the preferred embodiment of the present invention both nodes 101-103 and transceivers 104-105 contain the elements shown in transceiver 700. As shown, transceiver 700 comprises logic circuitry 701, receive circuitry 702, and transmit circuitry 703. Logic circuitry 701 preferably comprises a microprocessor controller, such as, but not limited to a Motorola PowerPC microprocessor. In the preferred embodiment of the present invention logic circuitry 701 serves as means for controlling transceiver 700, and as means for analyzing message content to determine any actions needed. Additionally receive and transmit circuitry 702-703 are common circuitry known in the art for communication utilizing a well known communication protocol, and serve as means for transmitting and receiving messages. For example, for nodes 101-103, receiver 702 and transmitter 703 are well known neuRFon™ transmitters that utilize the neuRFon™ communication system protocol. Other possible transmitters and receivers include, but are not limited to transceivers utilizing Bluetooth, IEEE 802.11, or HyperLAN protocols. Similarly, for transceivers 104 and 105, receiver 702 and transmitter 703 are well known transmitters that utilize the overlay communication system protocol (e.g., CDMA, TDMA, GSM, WCDMA, ..., etc.).

In the preferred embodiment of the present invention transceiver 700 may serve as a node wishing to discover a route to another node, may serve as a node aiding in route discovery between two differing nodes, may serve as a node that is trying to be located, or may serve as a transceiver in an overlay communication system participating in node discovery. Flow charts detailing operation of transceiver for these four scenarios are shown in FIG. 8 through FIG. 11.

Figure 8:
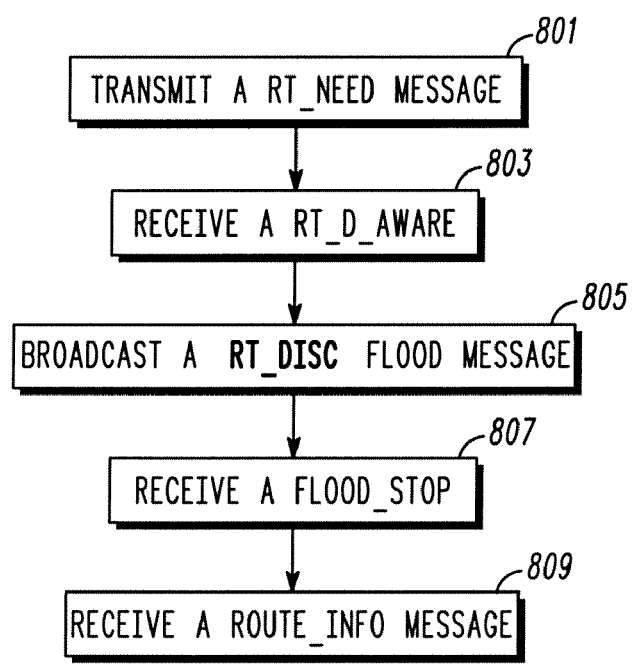
FIG. 8 through FIG. 11 are flow charts detailing operation of the transceiver of FIG. 7 in accordance with the preferred embodiment of the present invention.

FIG. 8 is a flow chart showing operation of transceiver 700 when performing the functions of a node trying to discover a route for transmission. In particular, the logic flow of FIG. 8 shows those steps necessary for a first node to discover a route to a second node. The logic flow begins at step 801 where logic circuitry 701 instructs transmitter 703 to transmit a RT_NEED message to an overlay transmitter. As discussed above, the RT_NEED message instructs the overlay communication system of the desire of transceiver 700 to find a route to a second node. In response, receiver 702 receives a RT_D_AWARE message that was broadcast to every node within the underlay communication system (step 803). As discussed above, the RT_D_AWARE message comprises identifications of both transceiver 700 and the second node. At step 805 logic circuitry 701 instructs transmitter 703 to broadcast a (RT_DISC) flood message to all neighboring nodes. After a period of time, receiver 702 receives a FLOOD_STOP message that was broadcast to all nodes within underlay communication system 110 (step 807). Finally, at step 809, receiver 702 receives a ROUTE_INFO message containing route information. This information is passed to logic circuitry 701. As discussed above, the ROUTE_INFO message contains information such as a sequence of IP addresses corresponding to each node from the first node to the second node.

Figure 9:
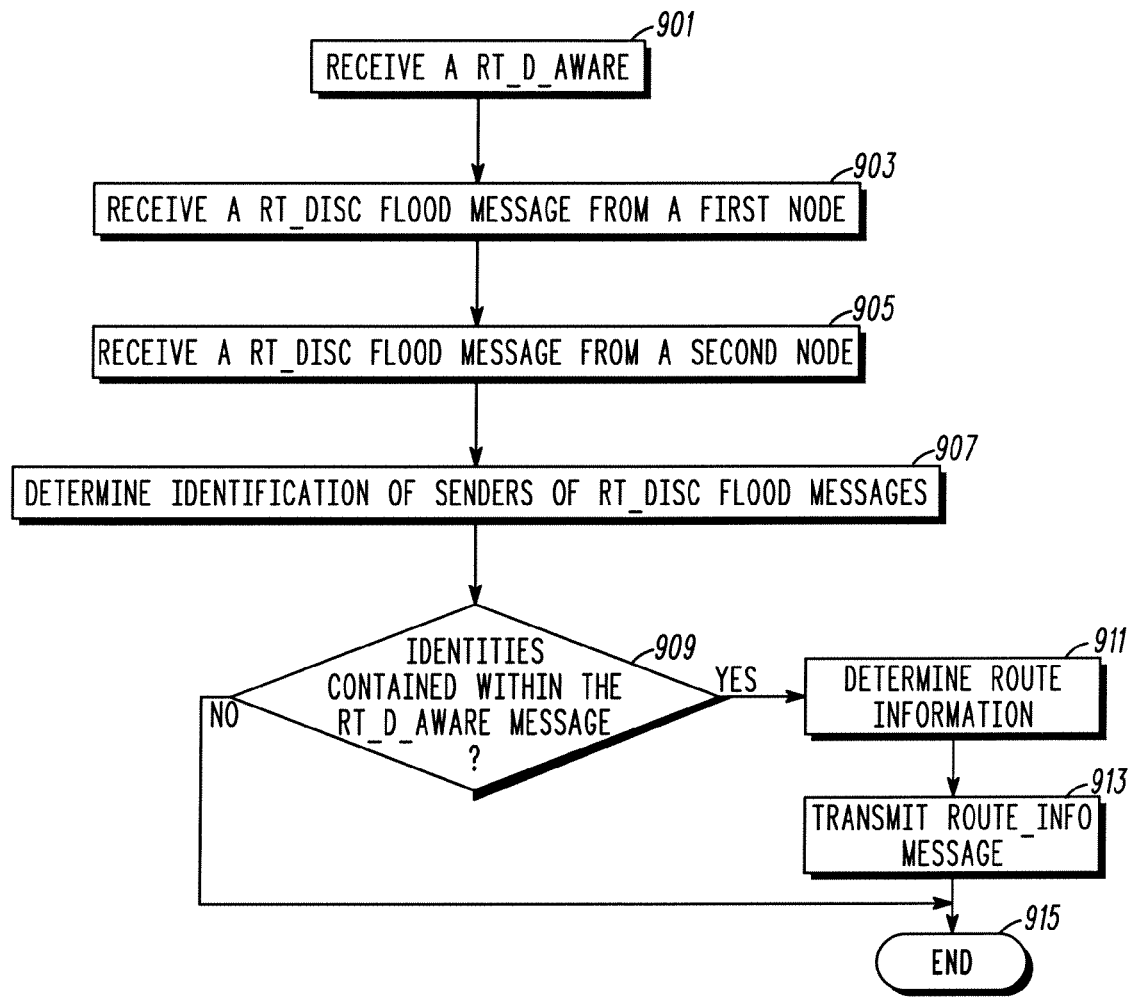

FIG. 9 is a flow chart showing those steps necessary when transceiver 700 is functioning as a node aiding in route discovery between two differing nodes. The logic flow begins at step 901 where receiver 702 receives a RT_D_AWARE message from overlay communication system, and passes the information to logic circuitry 701. As discussed above, the RT_D_AWARE message contains identifications for two nodes between which, a route is trying to be discovered. At step 903, receiver 702 receives a (RT_DISC) flood message from the first node, and at step 905, receiver 702 receives a (RT_DISC) flood message from a second node. Both messages are passed to logic circuitry 701. In response, logic circuitry determines the identification of the senders of the (RT_DISC) flood messages, (step 907), and at step 909 determines if the identities were the identities contained within the RT_D_AWARE message. If, at step 909 it is determined that the identities were the same, the logic flow continues to step 911 where logic circuitry 701 determines route information (e.g., a sequence of IP addresses corresponding to each node from the first node to the second node) and transmits this information to the overlay transceiver as a ROUTE_INFO message (step 913). In an alternate embodiment, the route information may be transmitted through the underlay communication system. This would be accomplished by utilizing the route information constructed by logic circuitry 701 to transmit the ROUTE_INFO message back through the sequence of IP addresses corresponding to each node from the current node to the first node. Continuing, the logic flow then ends at step 915. If, however, at step 909 it is determined that the identities are not the same, the logic flow ends at step 915.

Figure 10:
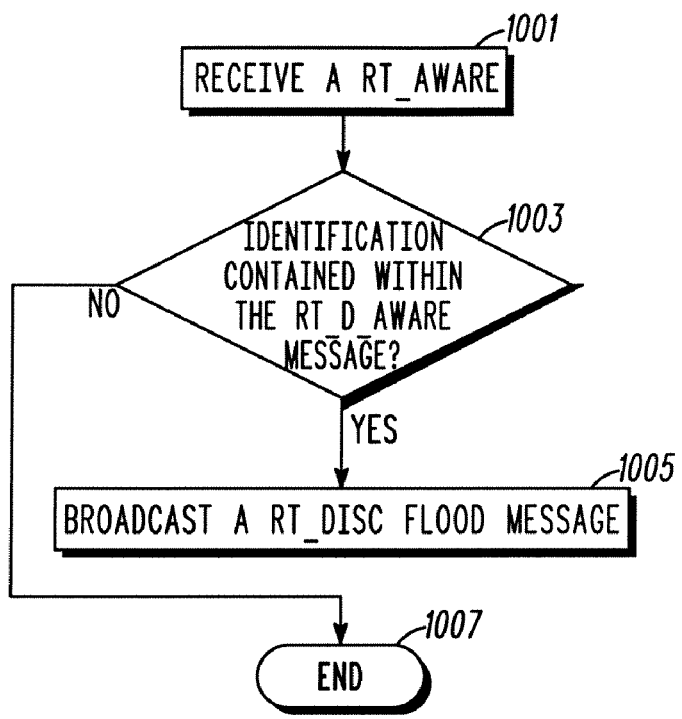

FIG. 10 is a flow chart showing operation of transceiver 700 when functioning as a node, a route to which is trying to be discovered. The logic flow begins at step 1001 where receiver 702 receives a RT_D_AWARE message. This message is passed to logic circuitry 701 where logic circuitry determines if its identification was contained within the RT_D_AWARE message (step 1003). If at step 1003, it was determined that the transceivers identification was contained within the RT_D_AWARE message, the logic flow continues to step 1005 where logic circuitry 701 instructs transmitter 703 to transmit a (RT_DISC) flood message, otherwise the logic flow ends at step 1007.

Figure 11:
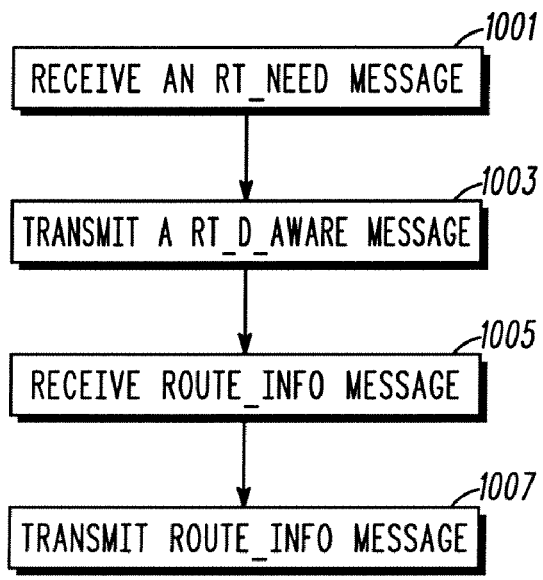

FIG. 11 is a flow chart showing operation of transceiver 700 when functioning as a transceiver in an overlay communication system aiding in route discovery. The logic flow begins at step 1101 where a RT_NEEDED message is received by receiver 702. In response, logic circuitry 701 instructs transmitter 703 to transmit a RT_D_AWARE message instructing all nodes in the underlay system to "listen" for communication between two nodes (step 1103). It should be noted that instead of broadcasting the RT_D_AWARE message to all nodes, in an alternate embodiment the message is simply multicast to a select subset of nodes within underlay communication system 110.

Continuing, at step 1105, a ROUTE_INFO message is received by receiver 702 from a node in the underlay communication system. This is passed to logic circuitry 701, and at step 1107 logic circuitry instructs transmitter 703 to transmit a ROUTE_INFO message to the first node wishing to discover the route. Although the preferred embodiment was described above, with route information being transmitted to a single node, in alternate embodiments route information may be broadcast to multiple nodes within underlay communication system 110. In other words, an alternate embodiment of the present invention includes broadcasting the ROUTE_INFO to all nodes so that they can have knowledge of the route in case any of the nodes wishes to communicate with another node along the sequence of nodes identified in the ROUTE_INFO.

As discussed above, because flooding takes place simultaneously from two nodes within the underlay communication system, the search will reduce the amount of signaling in half for a uniform distribution of the ad hoc nodes. This will equate into a less interference in the ad hoc network and less battery drain. A second advantage of the disclosure is the reduction of discovery time. If the search is unidirectional the expected time to discover the route is the time that a flood message reaches the target plus the time that the acknowledgement reaches the source. In the preferred embodiment of the present invention this time is cut in half since the message and the acknowledgement have to parse half of nodes than in the actual algorithms.

While the invention has been particularly shown and described with reference to a particular embodiment, it will be understood by those skilled in the art that various changes in form and details may be made therein without departing from the spirit and scope of the invention. For example, overlay network 120 may execute a step where after receiving a first ROUTE_INFO message, controller 701 sets a timer waiting to see if additional ROUTE_INFO messages are received before broadcasting the FLOOD_STOP message. This will enable alternate routes to be discovered for redundancy. If additional routes are identified by the time the timer expires, then a list of routes is sent to the first node by the overlay network controller. It is intended that such changes come within the scope of the following claims.

The invention claimed is:

1. A method for route discovery, the method comprising the steps of:

determining that a first node needs to communicate with a second node, wherein the first and the second nodes are part of an underlay ad-hoc communication system;

sending, by the first node, a message to an overlay communication system notifying the overlay communication system of the need to communicate with the second node;

receiving by the first node, from the overlay communication system, instructions to broadcast a route-discovery message;

broadcasting the route discovery message within the underlay communication system;

receiving by the first node, a message instructing nodes within the ad-hoc communication system to stop flooding route discovery messages; and receiving by the first node route information from the overlay communication system.

2. The method of claim 1 wherein the step of sending the message to the overlay communication system comprises the step of sending the message to a cellular communication system.

3. The method of claim 1 wherein the step of receiving route information comprises the step of receiving a sequenced list of IP addresses.

4. A method comprising the steps of:
receiving, by a first node, from an overlay communication system, a message instructing the first node to broadcast a route discovery message, wherein the first node exists within an underlay communication system, and wherein the first node is a node to which a route is trying to be discovered;

determining that the first node's identification is contained within the message; and broadcasting the route discovery message within the underlay communication system.

5. The method of claim 4 wherein the step of receiving from the overlay communication system comprises the step of receiving from a cellular communication system.

6. A method for operating a node within an underlay communication system, the method comprising the steps of:
receiving a message instructing nodes within an ad-hoc communication system to listen for a route discovery message from a first node and a route discovery message from a second node;

receiving the route-discovery message from a first node, wherein the first node is part of an underlay communication system;

receiving the route-discovery message from a second node, wherein the second node is part of the underlay communication system;

determining identifications of senders of the route-discovery messages;

determining if the identifications are contained within the message instructing the nodes to listen for the route discovery message;

determining route information based on the route-discovery messages; and transmitting the route information through an overlay communication system to the first node.

7. The method of claim 6 wherein the step of transmitting the route information comprises the step of transmitting the route information through an overlay cellular communication system.

8. A method comprising the steps of:
receiving at a base station in an overlay communication system, a message from a first node in an underlay communication system, the message indicating a need to discover a route to a second node;

broadcasting by the base station, a message to nodes within the underlay communication system, the message instructing the nodes to monitor for flood messages from the first and the second nodes;

receiving by the base station a message from a third node in an underlay communication system, the message comprising route information;

transmitting by the base station, a message to stop flood messages; and transmitting by the base station, the route information to the first node.

9. The method of claim 8 wherein the step of receiving the route information from the third node comprises the step of receiving a sequenced list of IP addresses from the third node.

10. The method of claim 8 further comprising the step of transmitting by the base station, a flood stop message causing nodes within the underlay communication system to cease transmission of flood messages.

11. An apparatus comprising:
means for determining that a first node needs to communicate with a second node, wherein the first and the second nodes are part of an underlay communication system;

means for sending, by the first node, a message to an overlay communication system notifying the overlay communication system of the need to communicate with the second node;

means for receiving by the first node, from the overlay communication system, instructions to broadcast a route-discovery message;

means for broadcasting by the first node, the route discovery message;

means for receiving by the first node, a message instructing nodes within the ad-hoc communication system to stop flooding route discovery messages; and means for receiving by the first node route information from the overlay communication system.

12. An apparatus comprising:
means for receiving, by a first node, from an overlay communication system, a message instructing the first node to broadcast a route discovery message, wherein the first node exists within an underlay communication system and wherein the first node is a node to which a route is trying to be discovered;

means for determining that the first node's identification is contained within the message: and means for broadcasting the route discovery message within the underlay communication system.

13. An apparatus comprising:
means for receiving a message instructing nodes within an ad-hoc communication system to listen for a route discovery message from a first node and a route discovery message from a second node;

means for receiving the route-discovery message from a first node, wherein the first node is part of an underlay communication system;

means for receiving the route-discovery message from a second node, wherein the second node is part of the underlay communication system;

means for determining identifications of senders of the route-discovery messages;

means for determining if the identifications are contained within the message instructing the nodes to listen for the route discovery message;

means for determining route information based on the route-discovery messages; and means for transmitting the route information through an overlay communication system to the first and the second nodes.

14. An apparatus comprising:

means for receiving at a base station in an overlay communication system, a message from a first node in an underlay communication system, the message indicating a need to discover a route to a second node;

means for broadcasting by the base station, a message to nodes within the underlay communication system, the message instructing the nodes to monitor for flood messages from the first and the second nodes;

means for receiving by the base station a message from a third node in an underlay communication system, the message comprising route information;

means for transmitting by the base station, a message to stop flood messages; and means for transmitting by the base station the route information to the first node.

* * * * *